US008538162B2

(12) United States Patent
Tuganbaev et al.

(10) Patent No.: US 8,538,162 B2
(45) Date of Patent: Sep. 17, 2013

(54) DATA CAPTURE FROM MULTI-PAGE DOCUMENTS

(75) Inventors: Diar Tuganbaev, Moscow (RU); Maryana Skuratovskaya, Moscow (RU); Sergey Zlobin, Moscow (RU)

(73) Assignee: ABBYY Software Ltd., Nicosia (CY)

( * ) Notice: Subject to any disclaimer, the term of this patent is extended or adjusted under 35 U.S.C. 154(b) by 33 days.

(21) Appl. No.: 13/431,767

(22) Filed: Mar. 27, 2012

(65) Prior Publication Data

US 2012/0183226 A1    Jul. 19, 2012

Related U.S. Application Data

(63) Continuation of application No. 12/470,425, filed on May 21, 2009, and a continuation of application No. 12/206,067, filed on Sep. 8, 2008.

(51) Int. Cl.
*G06K 9/46* (2006.01)

(52) U.S. Cl.
USPC .......................... 382/195; 358/1.18

(58) Field of Classification Search
None
See application file for complete search history.

(56) References Cited

U.S. PATENT DOCUMENTS

| | | |
|---|---|---|
| 4,996,665 A | 2/1991 | Nomura |
| 5,197,121 A | 3/1993 | Miyoshi et al. |
| 5,317,646 A | 5/1994 | Sang, Jr. et al. |
| 5,339,412 A | 8/1994 | Fueki |
| 5,422,743 A | 6/1995 | Farrell et al. |
| 5,428,694 A | 6/1995 | Betts et al. |
| 5,434,962 A | 7/1995 | Kyojima et al. |
| 5,459,827 A | 10/1995 | Allouche et al. |
| 5,555,101 A | 9/1996 | Larson et al. |
| 5,555,362 A | 9/1996 | Yamashita et al. |
| 5,633,996 A | 5/1997 | Hayashi et al. |
| 5,701,500 A | 12/1997 | Ikeo et al. |
| 5,727,220 A | 3/1998 | Hohensee et al. |
| 5,822,454 A | 10/1998 | Rangarajan |
| 5,848,184 A | 12/1998 | Taylor et al. |
| 5,848,186 A | 12/1998 | Wang et al. |
| 5,999,664 A | 12/1999 | Mahoney et al. |
| 6,002,798 A | 12/1999 | Palmer et al. |
| 6,400,845 B1 | 6/2002 | Volino |
| 6,456,738 B1 | 9/2002 | Tsukasa |
| 6,562,077 B2 | 5/2003 | Bobrow et al. |
| 6,941,521 B2 | 9/2005 | Lin et al. |
| 6,957,383 B1 | 10/2005 | Smith |
| 7,028,250 B2 | 4/2006 | Ukrainczyk et al. |
| 7,069,501 B2 | 6/2006 | Kunitake et al. |
| 7,149,347 B1 | 12/2006 | Wnek |
| 7,171,615 B2 | 1/2007 | Jensen et al. |

(Continued)

FOREIGN PATENT DOCUMENTS

| | | |
|---|---|---|
| JP | 11224346 A | 8/1999 |
| JP | 2004355528 A | 12/2004 |

*Primary Examiner* — Twyler Haskins
*Assistant Examiner* — Lennin RodruguezGonzalez
(74) *Attorney, Agent, or Firm* — John Meline; LeighAnn Weiland

(57) ABSTRACT

A method for processing a batch of scanned images is disclosed. The method includes processing the scanned images into documents. For documents of multiple pages, the method maintains a page-based coordinate system to specify a location of structures within a page and joins the pages to form a multi-page sheet associated with a sheet-based coordinate system to specify a location of structures within the multi-page sheet. Data may be extracted from each document through a page mode wherein structures are detected on individual pages using the page-based coordinate system and a document mode wherein structures are detected within the entire document using the sheet-based coordinate system.

19 Claims, 6 Drawing Sheets

(56) References Cited

U.S. PATENT DOCUMENTS

| | | |
|---|---|---|
| 7,310,635 B2 | 12/2007 | Tucker |
| 7,346,215 B2 | 3/2008 | Shih et al. |
| 7,383,496 B2 | 6/2008 | Fukuda |
| 7,529,408 B2 | 5/2009 | Vohariwatt et al. |
| 7,653,921 B2 | 1/2010 | Herley |
| 7,761,787 B2 | 7/2010 | Singleton et al. |
| 8,056,001 B2 | 11/2011 | Chao |
| 8,064,096 B2 | 11/2011 | Waara |
| 2002/0029232 A1 | 3/2002 | Bobrow et al. |
| 2002/0064316 A1 | 5/2002 | Takaoka |
| 2004/0153465 A1 | 8/2004 | Singleton et al. |
| 2005/0067482 A1 | 3/2005 | Wu et al. |
| 2007/0041041 A1 | 2/2007 | Engbrocks et al. |
| 2007/0133067 A1 | 6/2007 | Garg |
| 2007/0168382 A1 | 7/2007 | Tillberg et al. |
| 2008/0025608 A1 | 1/2008 | Meunier |
| 2008/0170786 A1 | 7/2008 | Tomizawa et al. |
| 2008/0195968 A1 | 8/2008 | Schacht |
| 2009/0028437 A1 | 1/2009 | Hirohata |
| 2009/0074296 A1 | 3/2009 | Filimonova et al. |
| 2009/0216794 A1 | 8/2009 | Saptharishi |

400

| Subj | Course Title | Lecturer | DOW | Time | Room |
|------|--------------|----------|-----|------|------|
| Autumn 2007 | | | | | |
| ENG | Rhetoric and Elocution | J. Wilson | mo | 9:00 am | 212 |
| SOC | General Sociology | R. Mitchell | mo | 11:00 am | 305 |
| MAT | Systems of EQ | N. Cooper | mo | 2:00 pm | 203 |
| MAT | Mathematical Analysis | M. Nielsen | tu | 11:00 am | 205 |
| HIS | Contemporary History | N. Davis | tu | 2:00 pm | 419 |
| ENG | Research and College Writing | F. Oneil | we | 9:00 am | 123 |
| GOV | International Politics | L. Dowling | we | 2:00 pm | 432 |
| LAN | Foreign Language | Elective | we | 4:00 pm | 6th floor |
| MAT | Mathematical Analysis | N. Davis | th | 9:00 am | 203 |
| ENG | Orthography and Spelling | B. Joyner | th | 11:00 am | 113 |
| BIO | Principles of Biology | S. Hill | th | 2:00 pm | 316 |
| PHL | Antique Philosophy | M. McKay | fr | 11:00 am | 110 |
| PHS | General Physics | T. Jones | fr | 2:00 pm | 507 |
| MAT | Polynomials and Approximation | A. Green | fr | 4:00 pm | 239 |
| Winter 2007 | | | | | |
| ENG | Orthography and Spelling | B. Joyner | mo | 11:00 am | 118 |
| PHL | History of Philosophy | T. Hubbard | mo | 2:00 pm | 115 |
| MAT | Graphing | J. Curtis | mo | 4:00 pm | 231 |
| BIO | Environmental Biology | E. Salazar | tu | 9:00 am | 303 |
| SOC | General Sociology | R. Mitchell | tu | 11:00 am | 305 |
| LAN | Foreign Language | Elective | tu | 2:00 pm | 6th floor |
| PHS | General Physics | S. Dixon | we | 9:00 am | 504 |
| PHS | General Physics | S. Dixon | we | 11:00 pm | 504 |
| HIS | Contemporary History | G. Smith | we | 2:00 pm | 406 |
| GOV | International Politics | R. Stone | th | 9:00 am | 203 |

*FIG. 4A*

| Subj | Course Title | Lecturer | DOW | Time | Room |
|---|---|---|---|---|---|
| MAT | Principles of Logic | L. Palmer | th | 11:00 am | 216 |
| ENG | Research and College Writing | F. Oneil | fr | 11:00 am | 112 |
| MAT | Mathematical Analysis | N. Davis | fr | 2:00 pm | 203 |
| SOC | Social Psychology | D. Barrera | fr | 4:00 pm | 329 |
| Spring 2008 | | | | | |
| LAN | Foreign Language | Elective | mo | 9:00 am | 6th floor |
| BIO | Environmental Biology | E. Salazar | mo | 11:00 am | 303 |
| HIS | American History | W. Travis | tu | 9:00 pm | 417 |
| HIS | American History | W. Travis | tu | 11:00 am | 417 |
| MAT | Principles of Logic | L. Palmer | tu | 4:00 pm | 216 |
| PHS | General Physics | S. Dixon | we | 9:00 am | 510 |
| ENG | Rhetoric and Elocution | H. Cote | we | 11:00 am | 124 |
| PHL | History of Philosophy | T. Hubbard | we | 2:00 pm | 106 |
| GOV | International Politics | R. Stone | th | 9:00 am | 203 |
| ENG | Orthography and Spelling | A. Springer | th | 11:00 am | 118 |
| SOC | Social Psychology | D. Barrera | th | 2:00 pm | 326 |
| MAT | Mathematical Analysis | N. Davis | fr | 11:00 am | 204 |
| MAT | Systems of EQ | P. Yang | fr | 2:00 pm | 207 |

*FIG. 4B*

DATA CAPTURE FROM MULTI-PAGE DOCUMENTS

CROSS-REFERENCE TO RELATED APPLICATIONS

For purposes of the USPTO extra-statutory requirements, the present application constitutes a continuation of U.S. patent application Ser. No. 12/470,425 that was filed on 21 May 2009, which is currently co-pending, or is an application of which a currently co-pending application is entitled to the benefit of the filing date.

The present application also constitutes a continuation of U.S. patent application Ser. No. 12/206,067 that was filed on 8 Sep. 2008, which is currently co-pending, or is an application of which a currently co-pending application is entitled to the benefit of the filing date.

The United States Patent Office (USPTO) has published a notice effectively stating that the USPTO's computer programs require that patent applicants reference both a serial number and indicate whether an application is a continuation or continuation-in-part. See Stephen G. Kunin, Benefit of Prior-Filed Application, USPTO Official Gazette 18 Mar. 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND

1. Field

Embodiments of the present invention involve implementations of methods and systems for creating a document structure description and capturing data from a document image.

2. Related Art

Typically, data from paper documents are captured into a computer database by a data capture system, which converts paper documents into electronic form (by scanning or photographing documents) and extracts data from document fields within the document.

Many documents, for example, phone bills, invoices, or registration forms are multi-page documents in that they have more than one page (an example of a multi-page document is shown in FIGS. 4A and 4B of the drawings). Often information contained in multi-page documents includes multiple groups of data having identical structures—for example, each group of fields may have a subheading, a table fragment, a subtotal, or a caption for the table fragment. The number and size of groups may vary from document to document of the given type and, consequently, the number of pages may also vary.

Sometimes, multi-page paper documents are immediately converted into multi-page electronic documents (e.g. into PDF or TIFF files), in which case a data capture system has to know in advance the pages that comprise the multi-page document. In other cases, documents are scanned page by page and appear as a sequence of individual images in the document capture system (sometimes, separator pages are used in this case to separate one document from another). In still other cases, documents of different types may be scanned one immediately after another, without any special separators. Therefore, in the general case, to capture data from a multi-page document, it is required to identify the page images that belong to a document of a certain type and then detect and extract the relevant data from the data fields.

As described in U.S. application Ser. Nos. 12/364,266 and 11/461,449, specially prepared flexible structure descriptions are used to capture data from paper documents. A flexible structure description comprises elements and relationships between the elements. A data field may be a type of element that identifies an area on the image from which data are to be extracted and the type of data that this area may contain. The positions of the fields are detected based on reference elements or anchors. An anchor corresponds to one or more predefined image elements (e.g., separator line, unchangeable text, picture) relative to which the positions of other elements are specified.

A flexible structure description may comprise an algorithm for detecting fields on semi-structured documents. Flexible structure descriptions are typically created by human experts and are loaded into a data capture system to be automatically or programmatically matched against incoming documents. However, existing techniques are inadequate for quickly and adaptively creating flexible structure descriptions for multi-page documents.

SUMMARY

In one embodiment, a method for enabling a data capture system to capture data from a document image corresponding to a document is provided. The method comprises defining a flexible structure description for the document, the flexible structure description comprising descriptions of structures in the document and detection information to facilitate detection of said structures in the document image, wherein the detection information specifies whether a structure is to be detected with reference to its placement within a page of the document, and/or with reference to its placement within the document as a whole; and provisioning a data capture system with the flexible structure description.

In another embodiment, a method for processing a batch of scanned images is provided. The method comprises processing the scanned images into documents; for documents comprising multiple pages, maintaining a page-based coordinate system to specify a location of structures within a page and joining the pages to form a multi-page sheet having a sheet-based coordinate system to specify a location of structures within the multi-page sheet; performing a data extraction operation to extract data from each document, said data extraction operation comprising a page mode wherein structures are detected on individual pages using the page-based coordinate system and a document mode wherein structures are detected within the entire document using the sheet-based coordinate system.

BRIEF DESCRIPTION OF THE DRAWINGS

FIGS. 4A and 4B each show a portion of a sample multi-page document with run-on fields and subheadings.

DETAILED DESCRIPTION

In the following description, for purposes of explanation, numerous specific details are set forth. Other embodiments and implementations are possible.

Reference in this specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In the following description, for purposes of explanation, numerous specific details are set forth in order to provide a thorough understanding of the invention. It will be apparent, however, to one skilled in the art that the invention can be practiced without these specific details. In other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In accordance with one embodiment of the invention, there is provided a process for creating a flexible structure description of a multi-page document. The process is performed by a data capture system such as a document scanner. Exemplary hardware corresponding to a data capture system for performing the process in illustrated in FIG. 5 of the drawings, and is described later.

Figure 1:
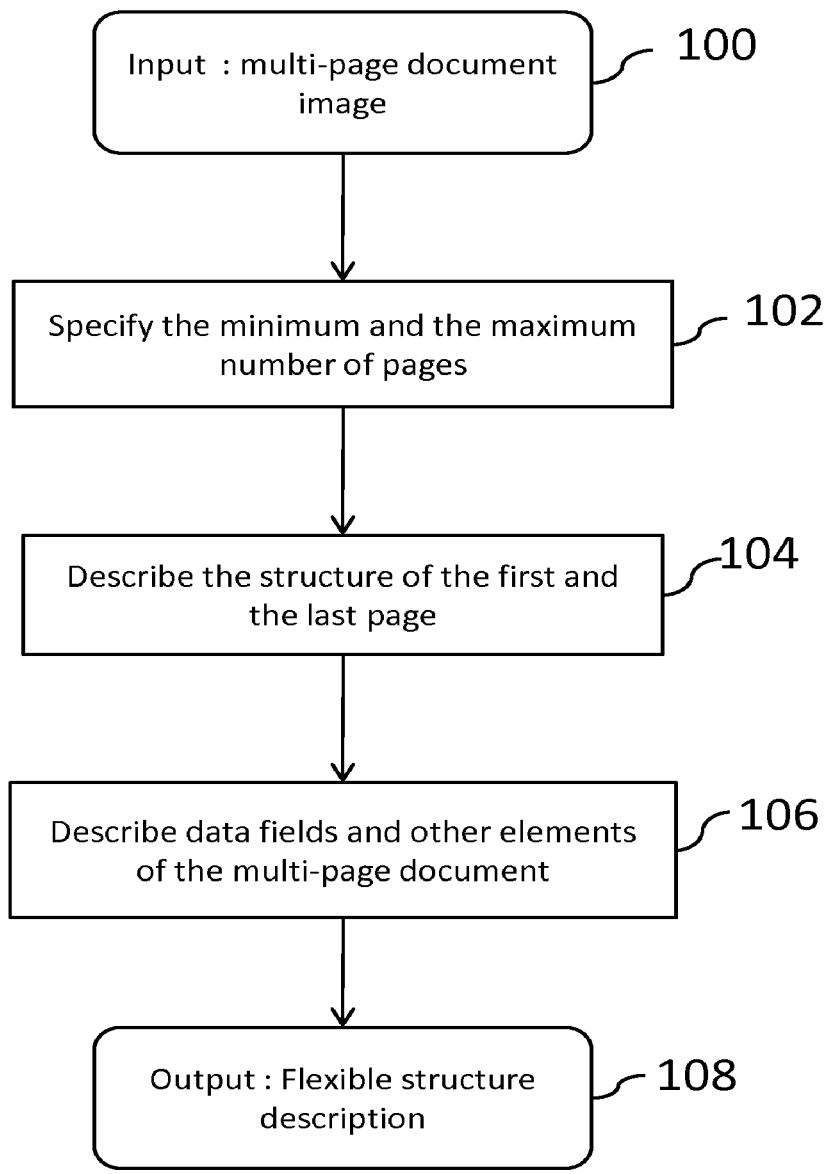
FIG. 1 shows a flowchart of a method for creating a structure description of a multi-page document, in accordance with one embodiment of the invention.

One embodiment of the process for creating a flexible structure description is illustrated by the flowchart of FIG. 1 of the drawings where the multi-page document is indicated with reference numeral 100.

Referring to FIG. 1, at block 102 the minimum and maximum number of pages for a document of a given document type is specified. In one embodiment, the minimum number of pages in a flexible structure description may be set to 1, as a brief document may well fit into one page. But the data capture system may also be fed documents which contain more than one page or which always contain a certain number of pages. To cover that latter case, in one embodiment, the likely number of pages for a document type is specified in its flexible structure description to help the data capture system to identify the required document faster and more reliably in the batch of incoming page images. In some embodiments a maximum number of pages for a given document type may also be specified. This number may be set to be greater than the actual maximum number of pages observed corresponding to the document type based on examining a number of document samples of the given type.

In one embodiment, in order to enable the data capture system to identify a document automatically, at block 104 special sections are created in the flexible structure description which describe the structure of the first (Header) page and the last (Footer) page of the document. Either of these sections may occur in a flexible structure description only once. In one embodiment, each of these sections is a complete structure description in its own right which describes anchor elements, fields, image objects, spatial relationships among elements, possible search areas, possible data types, etc.

Generally, the Header section describes the structure elements of the document's title, whereas the Footer section describes the structure elements of the final part of the document. In the case of a one-page document, the Header and Footer sections may be located on one and the same page.

Besides the Header and Footer sections, a structure description for a multi-page document may include descriptions of some data fields to be detected and of some anchor elements and their relationships within the structure of documents of the given type. These descriptions are created at block 106. In one embodiment, when describing individual elements, a range of pages may be specified on which the given element may occur. For example, the structure description may specify that a Table element may be found on any page except page 1, or that a Total Amount element may be found on the last page or on the last page but one. In the general case, any element may be placed on any page of the document, and its actual position is determined by its relation to other elements in the document structure expressed as "above," "below," "left of," and "right of" and by offsets relative to element boundaries.

A multi-page document may often contain repeating groups of fields. As an example, consider the document 400 shown in FIG. 4A and FIG. 4B of the drawings, where the "Subj", "Course Title", "Lecturer", "DOW", "Time", and "Room" fields define a repeating group of fields. Depending on the type of document, such groups may be placed differently across pages. Sometimes, a single page will contain one or more instances of a repeating group in its entirety. In other documents, an instance of a repeating group may flow over from one page onto the next, with some fields of the instance placed on one page and the others placed on the next (this type of repeating group is termed a "run-on" group). For the former case, and in one embodiment, the process 106 specifies that groups should be detected on individual pages ("page mode"), whereas and for the latter case, the process 106 specifies that groups are to be detected in the entire document ("document mode"). In one embodiment, for each repeating group of elements, the process 106 specifies a minimum and maximum possible number of instances. In document mode, the number of possible instances may be specified for the entire document, and in page mode the number of possible instances may be specified for individual pages.

Additionally, in one embodiment, the process 106 specifies a condition for searching the next instance relative to the previously detected instance. The condition may be specified as a combination of search direction (for example, by choosing from the four options: "above," "below," "left of," and "right of"), the boundary of the instance relative to which the search direction is specified, and the offset of the search area relative to the boundary.

Figure 2:
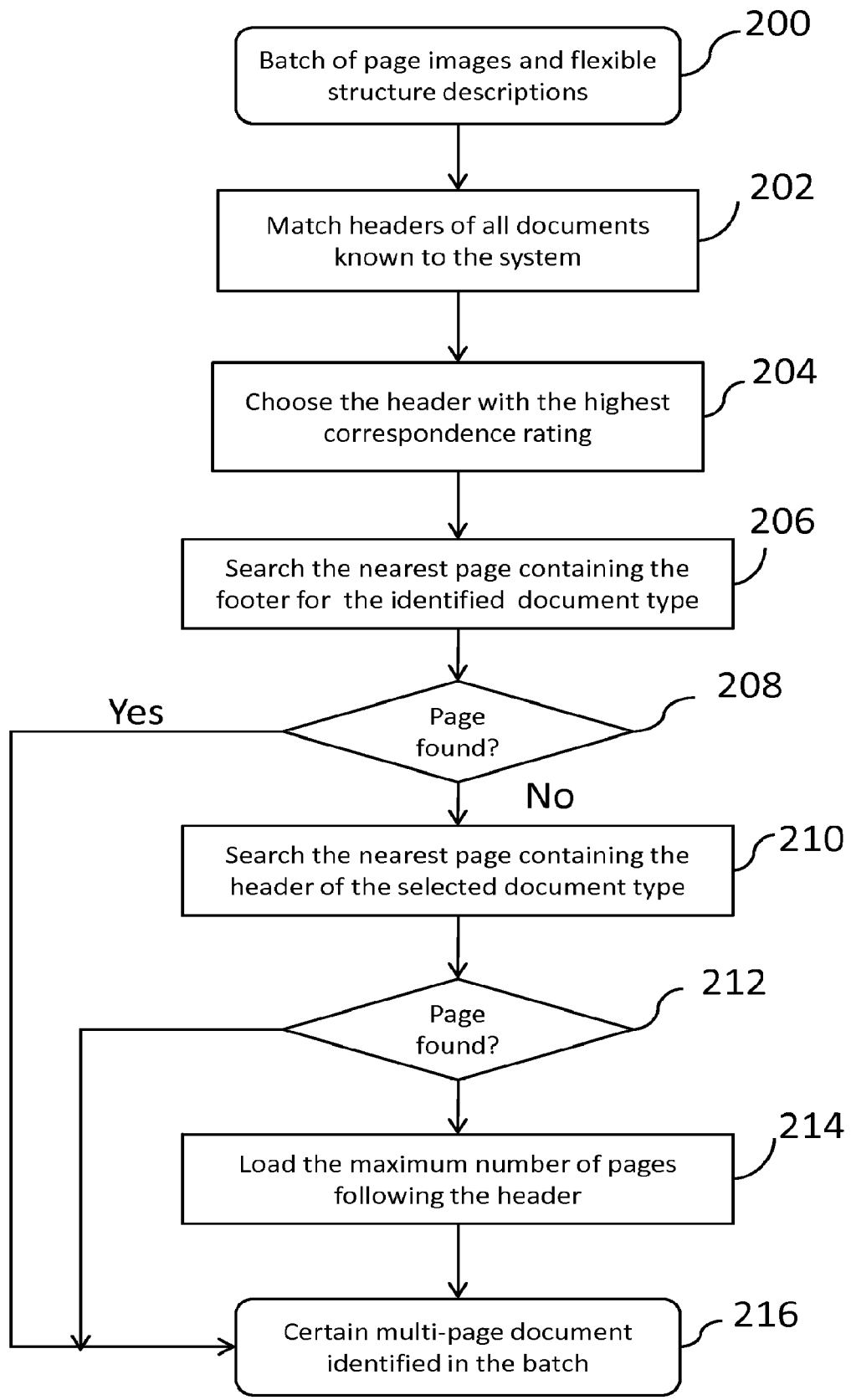
FIG. 2 shows a flowchart of a method for finding an individual document in a batch of various multi-page documents; in accordance with one embodiment of the invention.
Figure 5:
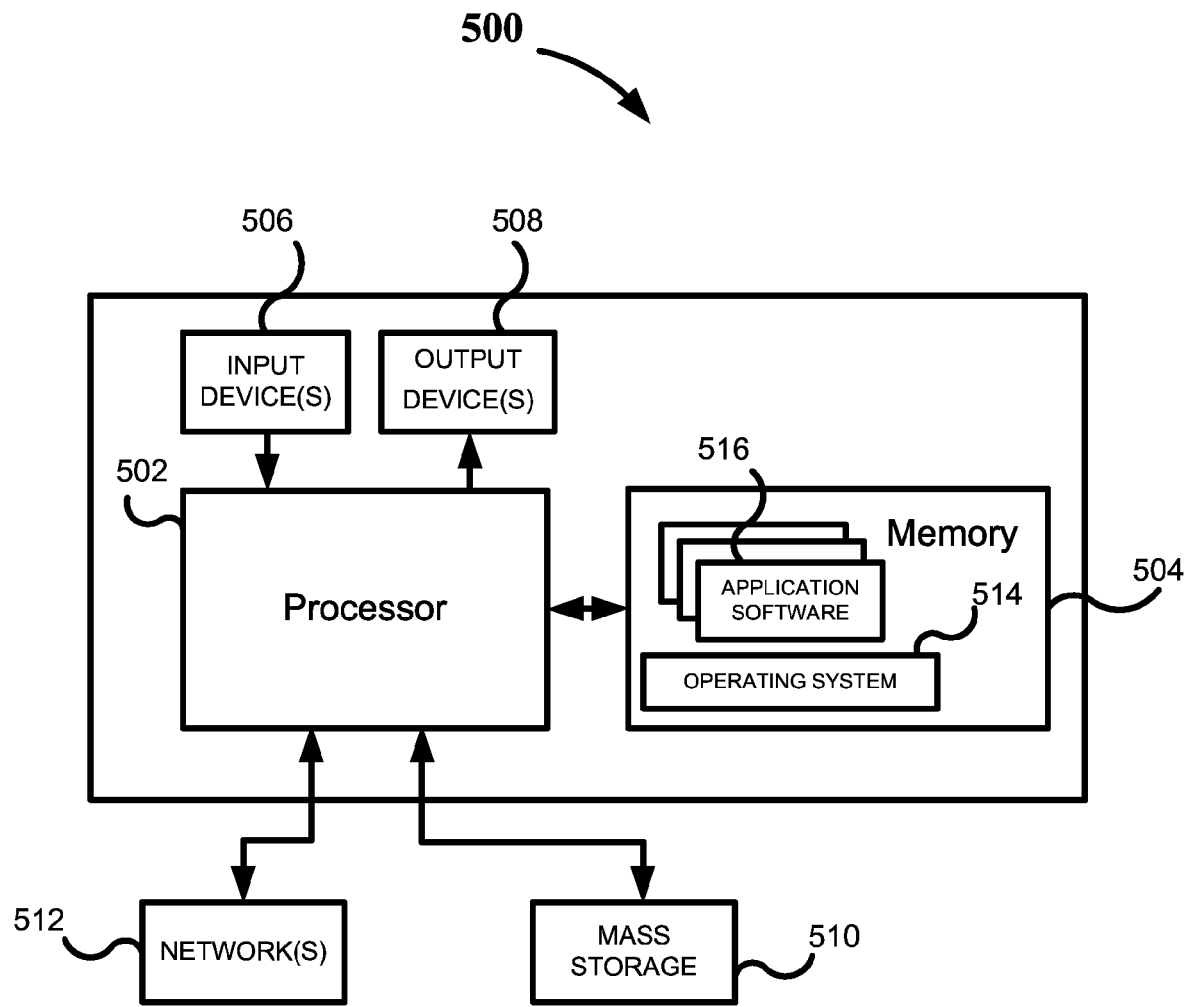
FIG. 5 shows a block diagram of a data capture system in accordance with one embodiment of the invention.

At block 108, the flexible structure descriptions of multi-page documents of different types are output. These structure descriptions are used by the data capture system to identify documents in a batch of incoming page images, to detect the relevant data fields, and extract the data contained in the data fields, as will now be described. Referring now to FIG. 2 of the drawings, there is shown a process for identifying a required document in accordance with one embodiment of the invention. The process typically may be performed by a data capture system such as is shown in FIG. 5. The process begins at block 200 where a batch of page images is input into the data capture system. At block 200, a batch of scanned page images are loaded. At block 202, each incoming page image is examined assuming that it is the first (header) page of one of the document types known to the system. In the process, the Header section of each structure description is matched against each incoming page image (202). The quality of the matching is rated on a scale of 0 to 1, where 0 means zero correspondence and 1 means 100% correspondence. If none of the Headers match the given page (i.e., if none of the matches has received a rating greater than zero), the next incoming page image is examined working on the assumption that it is the first page of the document. If several Headers of different document types match a certain page, preference is given to the document type whose Header has received the highest correspondence rating, thus at block 204 the beginning of the document is detected and its type is identified.

If the structure description does not contain a Header section, the entire structure description is used to identify the type of a document.

Once the document type is identified and its first page is detected, the last page of the document is detected. This is done at block 206 where a search is performed for the nearest page containing the footer for the identified document type. If the exact number of pages in a document is specified (e.g. the minimum number of pages equals the maximum number of pages), the system will treat the specified number of pages following the detected first page as one document. Document boundaries may also be specified explicitly by using special separator pages or by scanning pages into a multi-page image file.

If the end of the document is not explicitly specified, the system will consider all pages starting from the very first one as possible candidates for the end of the document. To detect the last page of the document, the system matches the Footer section of the document of the selected/identified type against each page. The first page for which the Footer correspondence rating is greater than zero is considered to be the last page of the document. Thus, the last page is considered found at block 208 and processing moves to block 216 where the document itself is considered identified in the batch of page images.

If the system has examined the maximum number of pages allowed by the structure descriptions and the Footer section has not matched any of them, the system will attempt to match the pages with Headers of all document types known to it at block 210. A detected header of a different document type enables the system to consider the previous page as the last page of the document to be identified. If the system fails to detect the last page at block 212 using the Header and Footer sections of the known document types, the system assumes that the number of pages in the document equals the maximum number of possible pages specified in its structure description. Thus, to identify the multi-page document in the batch of incoming page images the system loads the maximum allowed number of pages after the Header (at block 214).

Figure 3:
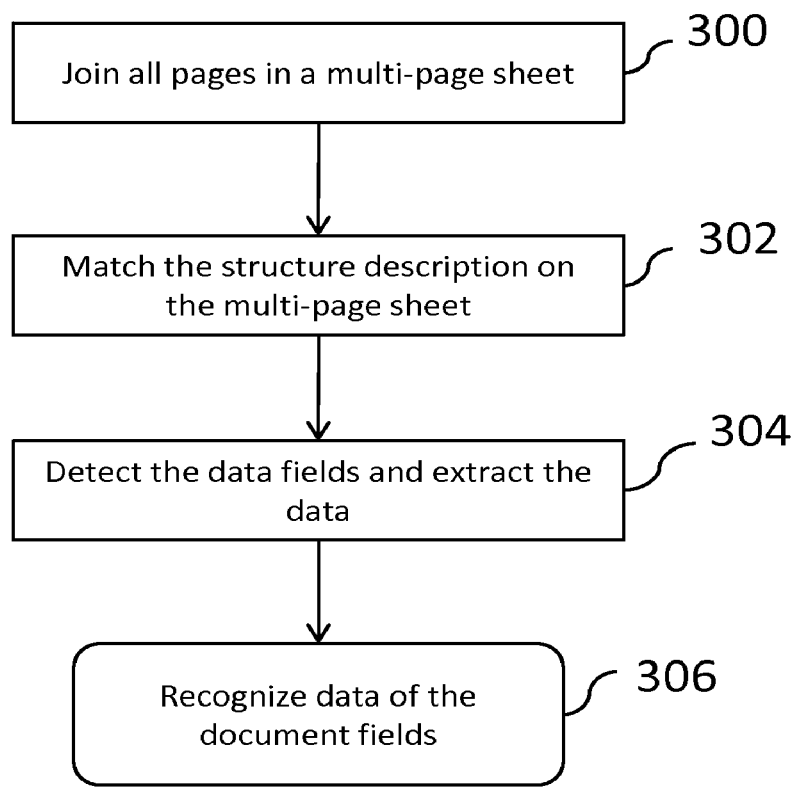
FIG. 3 shows a flowchart of a method for extracting data from fields on a document of a certain type, in accordance with one embodiment of the invention.

FIG. 3 shows a process of extracting data from data fields in a scanned image, in accordance with one embodiment. The process of FIG. 3 is executed after the identification process of FIG. 2. The multitude of all the pages of a document is termed a multi-page sheet. A multi-page sheet is obtained by merging or joining together the pages of the document top down at block 300 without any joints or gaps, and the left edges of all the pages are placed on the same axis that goes through the point (0, 0). The sequence of the pages in the sheet depends on their order in the batch.

Two coordinate systems are used—a global system of coordinates (goes through the entire document) and a local one (bound to a particular page). The only difference between the global and local coordinate systems is that the global system has parallel shifts, each page having its own shift.

EXAMPLE

Let there be 3 pages in a document having the following sizes: 2500.times.3500, 2400.times.3400, and 2300.times.3300. Then the global coordinates of the pages are: [0, 0, 2500, 3500], [0, 3500, 2400, 6900], [0, 6900, 2300, 10200] (in the order [left, top, right, bottom]).

For relations between elements, the global coordinate system is used, so that the relations, such as BELOW, are interpreted correctly.

Once the page images are joined into one multi-page sheet at block 300, the flexible structure description is applied to the entire sheet at block 302 as if it were an image of a page. Next, the system tries to detect the data fields and extract the data at block 304. At block 306, a recognition technique (e.g. Optical Character Recognition (OCR)) may be used to recognize the data extracted from the fields.

When matching repeating groups against a multi-page sheet, the system takes into account the possible locations of group instances, both on individual pages and in the document as a whole. During the search, the regions of already detected group instances are removed from the search area of the next instances so that the different instances of one and the same group would not overlap. At the same time the rectangles enclosing group instances may overlap. The search for instances of a repeating group is deemed complete when the system cannot find any of the elements of the group in the search area of the next instance.

The use of a multi-page sheet (global coordinate system) together with the images of individual pages (local coordinate system) makes it possible to solve tasks as complex as capturing data from documents with multi-page tables as is the case with the document 400 of FIG. 4A and FIG. 4B. Very often on each page of a document there is a running title at the top and/or at the bottom, with a table flowing over from one page to the next. In this case the running title interrupts the data contained in the table. Describing the running title as a repeating group which occurs once on each page enables the system to detect it and remove from the table search area. The information about the number, make-up, and order of columns in the table is used by the system when going from one page to the next.

Additionally, the concept of multi-page sheet enables the system to capture data from run-on tables with complex row structures. For example, a row may contain merged cells or may be located on more than one line (this is typical of wide tables where all columns do not fit on one line and are carried over to the next line) and flow over onto the next page. If this is the case, the row is described as a repeating group which should be detected in document mode.

FIG. 5 of the drawings shows an example of a data capture system 500. The system 500 may include at least one processor 502 coupled to a memory 504. The processor 502 may represent one or more processors (e.g., microprocessors), and the memory 504 may represent random access memory (RAM) devices comprising a main storage of the system 500, as well as any supplemental levels of memory e.g., cache memories, non-volatile or back-up memories (e.g. programmable or flash memories), read-only memories, etc. In addition, the memory 504 may be considered to include memory storage physically located elsewhere in the system 500, e.g. any cache memory in the processor 502 as well as any storage capacity used as a virtual memory, e.g., as stored on a mass storage device 510.

The system 500 also may receive a number of inputs and outputs for communicating information externally. For interface with a user or operator, the system 500 may include one or more user input devices 506 (e.g., a keyboard, a mouse, imaging device, etc.) and one or more output devices 508 (e.g., a Liquid Crystal Display (LCD) panel, a sound playback device (e.g., speaker, ear buds)).

For additional storage, the system 500 may also include one or more mass storage devices 510, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the system 500 may include an interface with one or more networks 512 (e.g., a local area network (LAN), a wide area network (WAN), a wireless network, and/or the Internet among others) to permit the communication of information with other computers coupled to the networks. It should be appreciated that the system 500 may include suitable analog and/or digital interfaces between the processor 502 and each of the components 504, 506, 508, and 512 as is well known in the art.

The system 500 operates under the control of an operating system 514, and executes various computer software applications, components, programs, objects, modules, etc. to implement the techniques described above. Moreover, various applications, components, programs, objects, etc., collectively indicated by reference 516 in FIG. 5, may also execute on one or more processors in another computer coupled to the system 500 via a network 512 such as in a distributed computing environment, whereby the processing required to implement the functions of a computer program may be allocated to multiple computers over a network. The application software 516 may include a set of instructions which, when executed by the processor 502, causes the system 500 to implement the method described above.

In general, the routines executed to implement the embodiments of the invention may be implemented as part of an operating system or a specific application, component, program, object, module or sequence of instructions referred to as "computer programs." The computer programs may comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

We claim:

1. A method for creating a flexible structure description for a multi-page document, the method comprising:
  acquiring electronic images of pages of at least one multi-page sample document;
  determining a minimum number of pages to be used in creating the flexible structure description from the electronic images of pages of the at least one multi-page sample document;
  determining a maximum number of pages to be used in creating the flexible structure description from the electronic images of pages of the at least one multi-page sample document;
  identifying a first page for the flexible structure description from the multi-page sample document;
  identifying a last page for the flexible structure description from the multi-page sample document;
  from the at least one multi-page sample document, determining a range of pages in which an element of the multi-page document may be detected; and
  storing information related to at least one of the minimum number of pages, the maximum number of pages, the first page identification, the last page identification, and the range of pages for one or more elements for the flexible structure description.

2. The method of claim 1, wherein the method further comprises determining a possible position in the first page for the element of the multi-page document.

3. The method of claim 1, wherein the method further comprises determining information identifying a location on one or more pages in which a repeating group of fields may be located in order to detect the repeating group of fields in images of pages from other multi-page documents.

4. The method of claim 3, wherein the repeating group of fields comprises one or more fields placed on one page with one or more additional fields placed on different page or different pages.

5. The method of claim 1, wherein the method further comprises determining information related to the element, the information describing the element's possible placement on a document page.

6. The method of claim 1, wherein the method further comprises determining information related to the element, the information describing the element's possible placement on pages of other multi-page documents.

7. The method of claim 1, wherein the maximum number of pages for the flexible structure description is determined from a plurality of multi-page sample documents, and wherein the maximum number of pages is equal to or greater than a maximum number of pages of any one of the multi-page sample documents.

8. The method of claim 1, wherein the flexible structure description comprises a maximum number of instances of the element that are capable of being detected in images of pages of other multi-page documents.

9. A data capture system, comprising:
an optical sensor;
a processor; and
a memory configured with processor-executable instructions which, when
executed by the processor, implement a method for creating a flexible structure description for a multi-page document, the method comprising:
acquiring electronic images of pages of a multi-page sample document;
identifying a first page for the flexible structure description from the multi-page sample document;
identifying a last page for the flexible structure description from the multi-page sample document;
from the multi-page sample document, determining a range of pages in which an element of the multi-page document may be detected in images of pages of other multi-page documents; and
electronically persisting in the memory the first page, the last page, and the range of pages for the element for the flexible structure description.

10. The data capture system of claim 9, wherein the instructions further cause the data capture system to:
determine a minimum number of pages for the flexible structure description from images of pages of the multi-page sample document; and
determine a maximum number of pages for the flexible structure description.

11. The data capture system of claim 9, wherein the instructions further cause the data capture system to:
determine a possible position for a first page for the element of the multi-page document.

12. The data capture system of claim 9, wherein the instructions further cause the data capture system to:
identify a location of one or more pages in which a repeating group of fields may be located in order to detect the repeating group of fields in images of pages from other multi-page documents.

13. The data capture system of claim 12, wherein the repeating group of fields comprises one or more fields placed on one page with one or more additional fields placed on a different page or pages, and wherein the instructions further cause the data capture system to:
determine an algorithm for finding instances of the repeating groups of fields in images of pages of other multi-page documents.

14. The data capture system of claim 9, wherein the instructions further cause the data capture system to:
determine information related to the element, the information describing the element's possible placement within other multi-page documents.

15. The data capture system of claim 10, wherein the maximum number of pages for the flexible structure description is determined from a plurality of multi-page sample documents, and wherein the maximum number of pages is equal to or greater than a maximum number of pages of one of the multi-page sample documents.

16. A non-transitory computer-readable medium having stored thereon instructions, which when executed by a processing system, cause the processing system to implement steps to create a flexible structure description for a multi-page document, the steps comprising:
acquiring electronic images of pages of a multi-page sample document;
identifying a first page for the flexible structure description from the multi-page sample document;
identifying a last page for the flexible structure description from the multi-page sample document;
from the multi-page sample document, determining a range of pages in which an element of the multi-page document may be detected; and
electronically persisting in a storage an indication of the first page, the last page, and the range of pages for the element for the flexible structure description.

17. The non-transitory computer-readable medium of claim 16, wherein the steps further comprising:
determining a possible first page position for the element of the multi-page document where the element is capable of being detected in images of pages of other multi-page documents.

18. The non-transitory computer-readable medium of claim 9, the method steps further comprising:
determining information identifying a location in document pages in which a repeating group of fields may be located when detecting the repeating group of fields in images of pages of other multi-page documents.

19. The non-transitory computer-readable medium of claim 18, wherein the repeating group of fields comprises one or more fields placed on one page with one or more additional fields placed on a different page or pages, and wherein the steps further comprising:
determining an algorithm for finding instances of the repeating groups of fields in images of pages of other multi-page documents.

* * * * *

UNITED STATES PATENT AND TRADEMARK OFFICE
CERTIFICATE OF CORRECTION

PATENT NO. : 8,538,162 B2  
APPLICATION NO. : 13/431767  
DATED : September 17, 2013  
INVENTOR(S) : Diar Tuganbaev et al.

Page 1 of 1

It is certified that error appears in the above-identified patent and that said Letters Patent is hereby corrected as shown below:

Title page, (75) Inventors:

"Maryana Skuratovskaya, Moscow (RU)" should read --Sergey Zlobin, Moscow (RU)--.

"Sergey Zlobin, Moscow (RU)" should read --Irina Filimonova, Moscow (RU)--.

Signed and Sealed this  
Thirty-first Day of December, 2013

Margaret A. Focarino  
*Commissioner for Patents of the United States Patent and Trademark Office*